United States Patent [19]

Eriksson et al.

[11] 4,296,452

[45] Oct. 20, 1981

[54] MULTIPHASE FAULT PROTECTION CIRCUITRY WITH VARIABLE FUNCTIONAL LEVEL DETECTION

[75] Inventors: Leif Eriksson, Sala, Sweden; Salomon Liberman, Ra'anana, Israel

[73] Assignee: Asea Aktiebolag, Vesteras, Sweden

[21] Appl. No.: 44,388

[22] Filed: Jun. 1, 1979

Related U.S. Application Data

[63] Continuation-in-part of Ser. No. 964,202, Nov. 28, 1978, abandoned.

[30] Foreign Application Priority Data

Nov. 28, 1977 [SE] Sweden .................................. 7713411

[51] Int. Cl.³ ........................ H02H 7/26; H02H 3/38
[52] U.S. Cl. ..................................... 361/82; 361/111
[58] Field of Search .................... 361/82, 83, 84, 109, 361/110, 111, 59, 65; 324/51, 52

[56] References Cited

U.S. PATENT DOCUMENTS

| | | | |
|---|---|---|---|
| 3,878,460 | 4/1975 | Nimmersjo | 361/82 X |
| 3,956,671 | 5/1976 | Nimmersjo | 361/65 X |
| 4,053,816 | 10/1977 | Nimmersjo | 361/110 X |
| 4,092,691 | 5/1978 | Williams | 361/110 X |

*Primary Examiner*—Patrick R. Salce
*Attorney, Agent, or Firm*—Watson, Cole, Grindle & Watson

[57] ABSTRACT

In circuitry for generating tripping and blocking signals for the protection of electrical components in an electrical power supply network as a result of the occurrence of faults therein, respective tripping and blocking outputs for each phase of an electrical power supply network are generated such that double or triple pole tripping is prevented unless the presence of an actual second tripping signal is detected subsequent to the detection of a first tripping signal. The respective tripping signals and blocking signals for each phase of the electrical power supply network are generated in dependence on whether the fault lies ahead or behind the electrical component to be protected, respectively, in response to measurement of the voltage and current associated with transient waves generated by faults in each electrical power supply network phase. The presence of a tripping signal resulting from the occurrence of a single phase fault, and the presence of a second tripping signal resulting from the occurrence of a fault in another phase are detected. The functional level of detecting the second tripping signal is modified or adjusted upon detection of the first tripping signal.

11 Claims, 9 Drawing Figures

MULTIPHASE FAULT PROTECTION CIRCUITRY WITH VARIABLE FUNCTIONAL LEVEL DETECTION

This application is a continuation-in-part application of Ser. No. 964,202, filed Nov. 28, 1978; and now abandoned.

BACKGROUND

1. Field of the Invention

The present invention relates to multiphase protection circuitry for electrical power supply networks, and more particularly to such protection circuitry provided with means for temporarily changing the functional level of the remaining intact phases, after a fault in a phase which causes a temporary disconnection of the faulty phase, in such a way that the resultant phenomena occurring in the intact phases during the switching operation in the faulty phase does not cause disconnection of the intact phases, but, if a real fault occurs in the intact phases, a triple-pole tripping is effected.

2. Prior Art

When a fault occurs in an electrical power supply network, an electrical transient wave propagates therein and, because of repeated reflections in various discontinuities in the network, such as transformers, stations and the sources of the fault, the currents and voltages contain transients which are disadvantageous for the measuring relays in the relay protection devices. The dominant frequencies in such transients depend on the distance to the fault and the network configuration. Investigations have shown that, even with the introduction of transient suppression filters, it is difficult to use, for example, conventional impedance relays for relay protection devices, the operating time of which is to be less than the time of a cycle. In case of higher system voltages, greater demands are placed on the rapidity of the relay protection devices, while at the same time the damping of the transient waves decreases. It is therefore more difficult to apply traditional measuring principles to the relay protection devices.

From, for example U.S. Pat. No. 3,956,671, it is known to utilize the direction of movement of the transient waves at a measuring point for determining the direction to the source of disturbance. By comparing the polarities of the current and voltage waves, for example, it is possible to determine whether the fault lies ahead or behind the measuring point.

In the case of single-phase faults in networks with high system voltages, particularly in radial or thinly meshed networks, it is sometimes desirable for the relay protection devices to release only the faulty phase (so-called single-pole tripping). Since the other two phases are intact, it is easier to maintain stability in the network, at least for some time until high speed reclosing of the originally faulty phase.

In conjunction with the disconnection of a single-phase fault, it may however happen that the transient waves which then occur in the intact phases have a greater amplitude than those which occur in connection with the fault. The magnitude of the transient waves is dependent on the relationship between the load current and the fault current. This relationship may vary a great deal depending on the system voltage, the network configuration, the type of the fault, the source of the fault, and so on.

It is clear from the above that a protection device based on measuring transient waves may sometimes encounter problems with a correct choice of phases in case of a single-phase fault, since disconnection of a single-phase fault may result in a triple-pole tripping. One solution to this problem is to prevent new signals from arriving into the protection device after a single-phase fault has been detected, for example by fully blocking a level detector. However, this is not a very good solution, since as a rule it is desirable to be able to effect triple-pole tripping if a new fault- single-phase or double-phase—occurs in the intact phases before the line circuit-breaker has time to release the first occurring single-phase fault. The tripping time of the circuit-breaker may vary from about 20 ms to 100 ms depending on the type of circuit-breaker used.

SUMMARY OF THE INVENTION

The above objects, advantages and features of the invention are obtained in circuitry for generating tripping and blocking signals for the protection of electrical components in an electrical power supply network as follows. Respective tripping and blocking signals are generated for each phase of the electrical power supply network in dependence on whether the fault lies ahead or behind the electrical component to be protected, respectively, in response to measurement of the voltage and current associated with transient waves generated by faults in each electrical power supply network phase. The presence of a tripping signal resulting from the occurrence of a single phase fault and the presence of a second tripping signal resulting from the occurrence of a fault in another phase as detected. The functional level of detecting the second tripping signal is changed in response to the detection of the presence of the first tripping signal. Respective tripping and blocking outputs for each phase of the electrical power supply network are generated in response to an output of the tripping signal detector whereby double or triple pole tripping is prevented unless the presence of the second tripping signal is detected.

In one embodiment, the detector includes first and second level detection means for respectively detecting the presence of the first and second tripping signals, and the means for changing the functional level for detecting the second tripping signal includes switching means for switching from the first to the second level detection means in response to the presence of a tripping signal detected by any of the first level detection means and for switching back to the first level detection means after a predetermined time interval. The circuitry also includes phase selector means responsive to the detection of a first tripping signal by any of the first level detection means for actuating the switching means.

The selector means includes gating means responsive to the output of any of the first level detection means for generating an output signal with the gating means being inhibited by more than one output of the gating means. The first selector means also includes a timing circuit for generating a switching output signal for acutating the switching means in response to the output of the gating means, and having a duration determining the period that the second level detection means is acutated whereupon the switching means switches to the first level detection means.

The above circuitry may also be modified such that the switching means switches the respective outputs of the first and second level detection means.

In a modified embodiment, each of the first and second level detection means may comprise an amplifier circuit having a first input for tripping signals from a respective phase of the tripping signal generator and a second input adapted to be connected to respective first and second reference levels with the switching means connecting the second inputs to the second reference level in response to the detection of a tripping signal to any of the phases. After a predetermined interval, the switching means connects each of the second inputs to the first reference level.

The means for changing the functional level of detecting the second tripping signal may be modified to include amplifier means for amplifying the tripping signal in each electrical power supply network phase, and the switching means then adjusts the amplification of the amplifier means in response to the detection of the tripping signal. The detection means is then responsive to the output of the amplifier means.

In another modification, the means for changing the functional level of detecting the second tripping signal may include means for multiplying the second tripping signal by a weighting function subsequent to the detection of the first tripping signal. The means for changing the functional level of detecting the second tripping signal may be further modified to include a filter having variable amplifier circuit means, and the switching means then reduces the amplification of the variable amplifier means in response to the detection of a tripping signal.

DETAILED DESCRIPTION

Figure 1:
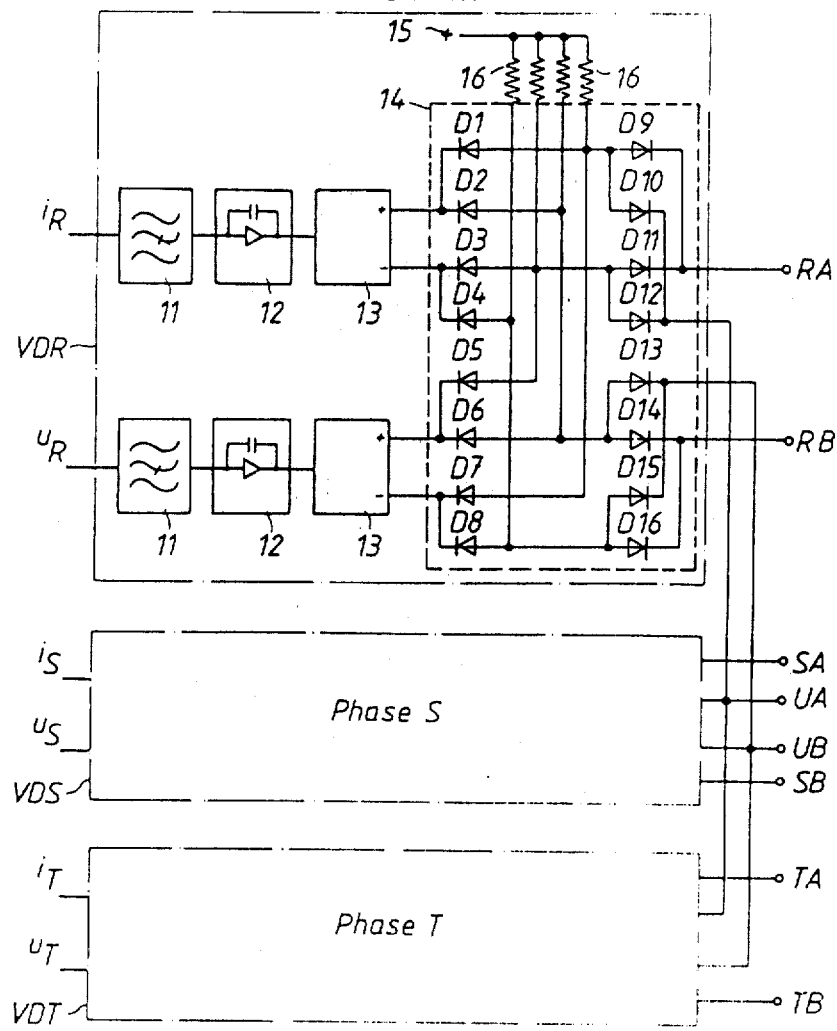
FIG. 1 shows a known wave detector for generating tripping and blocking signals.

FIG. 1 shows a three-phase, directional wave detector assembled from three identical single-phase partial detectors VDR, VDS and VDT, one for each phase, and which constitutes a basic component of the protection device. Only partial detector VDR is shown in its entirety in FIG. 1. Each partial detector has an input $i_R$, $i_S$, or $i_T$, respectively representing current measurement signals in the three phases and an input $u_R$, $u_S$, or $u_T$, respectively representing voltage measurement signals. The signals correspond to the three phase currents through the measuring point and three suitably chosen phase voltages, and are normally derived by means of instrument transformers as is known in the art. For each of the current and voltage measurement input signals, each partial detector has band exclusion filters 11, 11' which trap components of the input signal having the same frequency as the power supply network, and the output of which is connected to integrating circuit 12 or 12'. Polarity indicators 13, 13' connected to the output of the respective integrating circuit, each have a + output and a − output and conduct the signal received from the integrator to the + output if it is positive, and to the − output as a positive signal if the received signal is negative.

Each partial detector contains a directional detector 14, which in partial detector VDR is marked by dashed lines. Directional detector 14 is constructed from a number of diodes D1-D16 connected to the + pole of voltage source 15 through resistors 16. Directional detector 14 delivers an output signal on output RA and the output UA, which is common to the whole wave detector, if the signals to the two polarity indicators 13, 13' have different polarities, whereas an output signal occurs on outputs RB and UB, respectively, if the signals have the same polarity.

The output signal is positive in the embodiment shown in FIG. 1 and its amplitude corresponds to the amplitude of the smallest of the input signals to polarity indicators 13, 13'. The largest of the signals occurring at RA, SA, TA and RB, SB, TB, respectively, is emitted to the outputs UA and UB, which are common to all three partial detectors, because of the operation of diodes D9-D16 at the output side of directional detectors 14.

In each connection to an electrical component, the positive current direction is defined as the direction towards the component in question. If a transient wave moves in the negative direction, the wave detector emits tripping signals on tripping outputs RA, SA, TA and on UA; and if the transient wave moves in the positive direction, blocking signals are obtained on blocking outputs RB, SB, TB and on UB. If a certain wave detector is used for protection of a second adjacent component, the blocking signal has a tripping effect, and the tripping signal a blocking effect for the second component.

Figure 2:
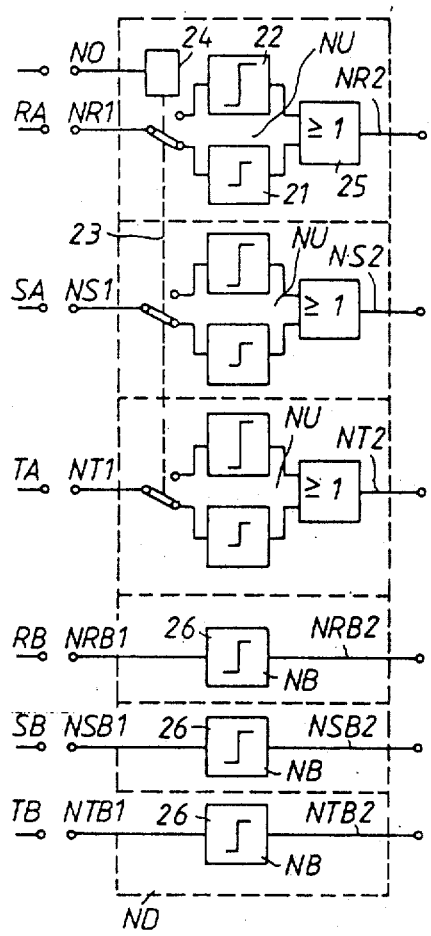
FIG. 2A shows a schematic of a level detector according to the invention and having inputs for connection to the outputs of the wave detector of FIG. 1.
FIGS. 2B, 2C, 2D and 2E illustrate respective alternative embodiments for carrying out the level detector function of the circuit of FIG. 2A.

The output signals from single-phase partial detectors VDR, VDS, VDT are supplied to level detector ND, which may be designed as shown in FIG. 2. Level detector ND includes three partial detectors NU for tripping signals, one for each phase R, S, T and three partial detectors NB for blocking signals, one for each phase R, S, T. Each tripping partial detector NU or NB has two level-sensing circuits 21, 22, which are alternatively connectible to corresponding inputs NR1, NS1, NT1 of level detector ND by means of triple-phase switch 23. Level-sensing circuits 21, 22 each have different levels and normally lowest level, level-sensing member 21, is connected as shown in FIG. 2. The switching is carried out by drive means 24 when a signal is supplied to its input NO, as is described below. The respective outputs of level-sensing circuits 21, 22 are connected to OR gate 25, the output of which is connected to a respective one of tripping outputs NR2, NS2, NT2 of level detector ND. Each of blocking partial detectors NB includes level-sensing circuit 26, the input of which is connected to one of inputs NRB1, NSB1, NTB1 and the output of which is connected to one of the outputs NRB2, NSB2, NTB2.

Figure 3:
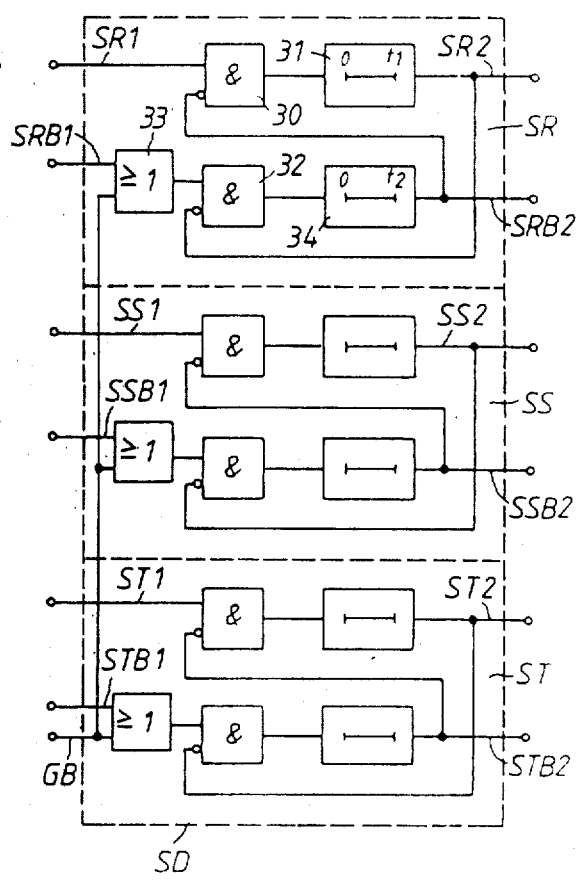
FIG. 3 shows a sequence detector having inputs for connection to the outputs of the level detector of FIG. 2.

FIG. 3 shows a schematic of sequence detector SD included in the logic system. It comprises three identical partial detectors SR, SS, ST, one for each phase. Since the three partial detectors are identical, only partial detector SR of the R0 phase is described in detail. Partial detector SR includes first AND gate 30, one input of which is connected to input SR1, which in the logic system is connected to the output NRU2 of the level-sensing partial detector NRU. The output of AND gate 30 is connected through delay circuit 31 to output SR2 of partial detector SR. An input of second AND gate 32 is connected to the output of OR gage 33, one input of which is connected to input SRB1 of partial detector SR. Input SRB1 is a blocking input and connected in the logic system to blocking output NRB2 of the level-sensing partial detector NRB. The second input of OR gate 32 is connected to blocking input GB common to the entire sequence detector SD. Blocking input VB is a blocking signal, for example from a protection device in an adjacent component when the last-mentioned protection device has tripped. The second input of AND gate 32, which is inverted, is connected to output SR2 and its output is connected, via second time delay circuit 34, to the blocking output SRB2 as well as to the second inverted input of first AND gate 30.

When no signal is present, a "one" is applied on the lower, inverted input of each of gates 30 and 32. If a tripping signal arrives at the upper input of gate 30, a "one" appears on its output and a tripping signal appears on output SR2 for at least the time interval $t_1$. The lower input of AND gate 32 is "zero", whereby a possible blocking signal on input SRB1 cannot pass AND gate 32 and occur as a blocking signal on output SRB2.

Figures 4, 5:
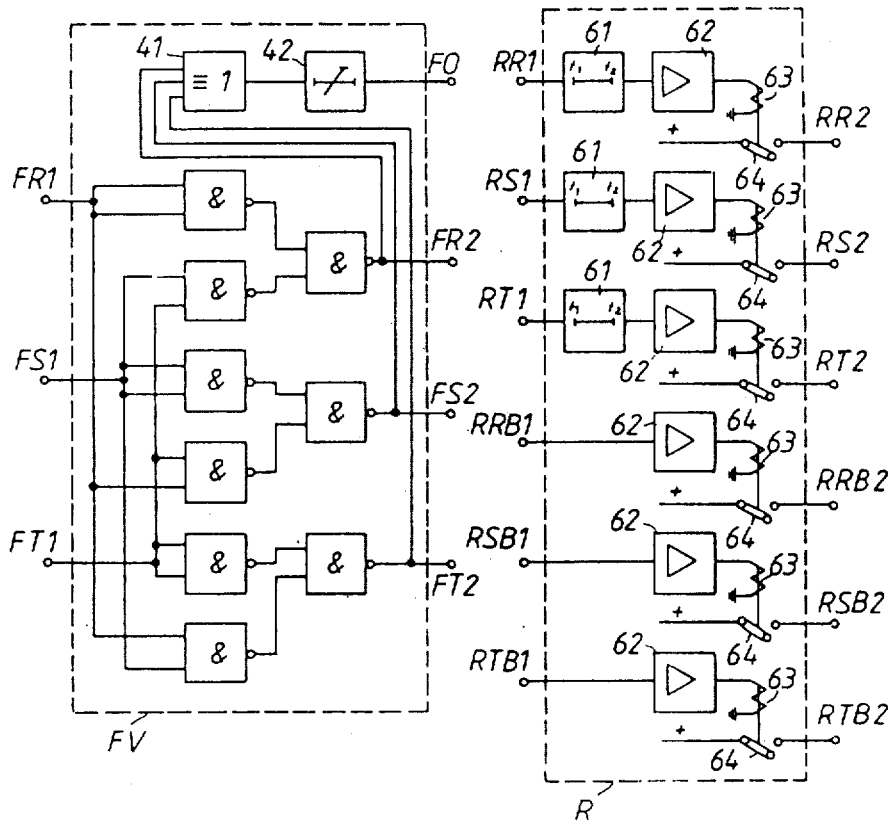
FIG. 4 shows a phase selector adapted to be connected to the sequence detector of FIG. 3.
FIG. 5 shows a relay unit responsive to the outputs of the phase selector of FIG. 4.

Fir single pole tripping of circuit-breakers in the case of a single-phase ground fault, the protection logic system includes phase selector FV (an exemplary embodiment thereof is shown in FIG. 4) constructed of logic elements. Phase selector F generates a "one" on all outputs FR2, FS2 and FT2 if at least two of inputs FR1, FS1 and FT1 are a "one". If, however, as is the case with a single phase fault, only one of the inputs is a "one", only the corresponding output will provide a "one". Inputs FR1, FS1, FT1 are respectively connected to partial detector outputs SR2, SS2, ST2. The operation of phase selector F is apparent from its logic structure and therefore a detailed explanation is not necessary for the purposes of using the invention.

To achieve a change of the functional value of the protection circuit by means of the previously mentioned switching of level detector ND, phase selector FV is provided with gate 41 having three inputs which are each connected to an output of the phase selector. Gate 41 generates a "one" on its output if one, and only one, of its inputs is a "one". Gate 41 is connected to output FO through adjustable delay circuits 42, and output FO is connected to input NO of drive means 24 for switch 23 of the level detector ND. If a single-phase tripping signal occurs on one of outputs FR2, FS2 or FT2 of phase selector FV, drive means 24 receives an impulse to reset switch 23, after the time interval or delay determined by circuit 42, so that level-sensing circuits 22, with a higher sensing level, are connected to input NR1. This eliminates the risk that transient waves, which may occur in the intact phases upon disconnecting the faulty phase, may pass through level detector ND. The higher level, determined by level-sensing circuits 22, must however, not be so high that level detector ND blocks for a real fault in the intact phases. After the time delay determined by timing circuit 42, switch 23 returns to the position shown in FIG. 2 and level detector ND resumes its normal level of protection.

In a further alternative for switching the functional value of the protection circuit, level-sensing circuits 21, 22 of level detector ND are connected for each phase to the respective phase inputs NR1, NS1, NT1. Switch 23 is then arranged on the outputs of level-sensing circuits 21, 22 and normally maintains the output of level-sensing circuit 21 connected to output NR2, NS2, NT2 as shown in FIG. 2B. When resetting switch 23, by drive means 24 upon signal FO from phase selector FV, second level-sensing circuit 22 is connected to the output of level-detector ND.

Figure 2E:
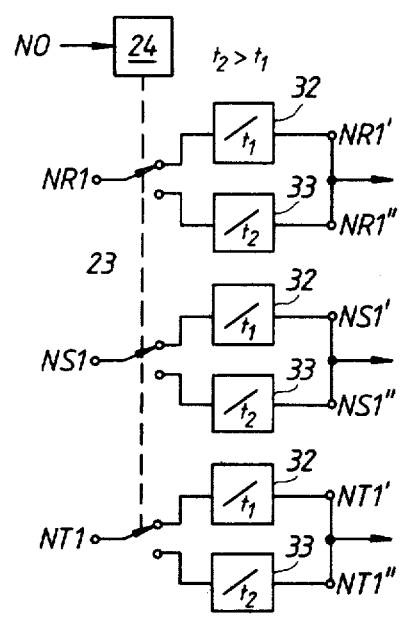
Figure 2B:
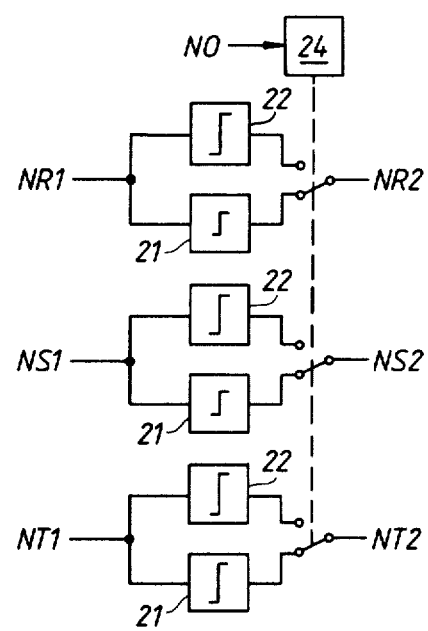
Figure 2C:
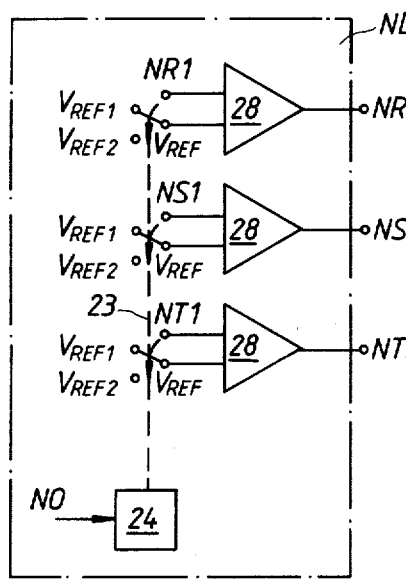

Level-sensing circuits 21, 22 for each phase in level detector ND may, in principle each consist of an amplifier circuit 28 having one input connected to input NR1, NS1, NT1, respectively, of the level detector, and another input connected to a reference voltage as shown in FIG. 2C. When an input signal to level detector ND exceeds the reference voltage, the output switches, and the level detector emits an output signal. Instead of having two level-sensing circuits per phase and having one of them determine the functional level, the reference voltage can be altered to change the functional level. In this modification, switch 23 driven by drive means 24 switches the VREF for each amplifier circuit 28 from VREF1 to VREF2 upon receipt of input signal NO from phase selector FV.

Figure 2D:
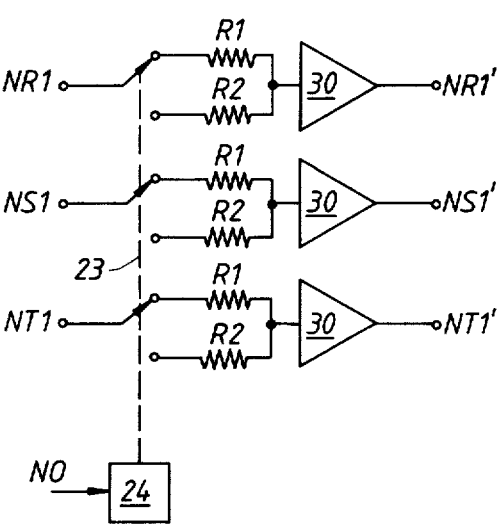

Moreover, if an amplifier is arranged to amplify the respective output signals of single-phase partial detectors VDR, VDS, VDT before being input to level detector ND, the functional level of the protection circuit can be changed by changing the degree of amplifier amplification as shown in FIG. 2D. In that case level detector ND may have one single, fixed level. An increase in the functional value is effected in this case by a reduction of the degree of amplification, by the actuation of switch 23 which connects the switch contact to insert resistance $R_2$ into the input of amplifiers 30 instead of normally connected resistance $R_1$ upon receipt of signal NO to drive means 24. Outputs NR1', NS1', NT1' are then input to a single-level, level detector ND.

If the input signal before the level detector is multiplied by a weighting function, for example a function where the signal amplitude is dependent on time, the functional value of the protection circuit can be changed by changing the weight function as shown in FIG. 2E. In FIG. 2E, weight function generators 32, 33 have respective integration intervals $t_1$, $t_2$, with $t_2 > t_1$. The respective outputs NR1', NR1"; NS1, NS1"; NT1', NT1" are input to a single level detector ND (not shown).

If the protection circuit comprises a filter before the level detector, the functional value can be varied by changing the amplification of the filter. The signal coming from the phase selector upon the occurrence of a single-phase fault can then be used for reducing the amplification of the filter for the time during which the non-desirable transient phenomena can be expected to appear in the intact phases. Such a circuit is similar to that shown in FIG. 2E where amplifiers 30 are filter-amplifier circuits.

In the foregoing description it has been assumed that the signals occurring are positive in relation to a reference ground, so that a higher signal level is more positive than a lower level. It is to be understood, of course, that the invention also has application to the case where negative signals are used, and that a higher signal and functional level respectively, may relate to a more negative signal and functional level, respectively.

The protection circuit is provided in the known manner with relay unit R, as shown in FIG. 5, which has one input RR1, RS1, RT1 for each phase, and connected to a corresponding output FR2, FS2, FT2 of phase selector FV according to FIG. 4. For each phase relay unit R has one time delay circuit 61 and one amplifier 62. Time delay circuit 61 extends on incoming tripping pulse so that it lasts for the time $t_2$ provided that the tripping pulse has lasted at least for the time $t_1$. Amplifier 62 feeds current to winding 63 of a relay with make contact 64. On the operation of the relay, a tripping current is fed into a corresponding output RR2, RS2, RT2.

Relay unit R is also provided withs three inputs RRB1, RSB1, RTB1 for blocking signals and these inputs are connected to corresponding blocking outputs NRB2, NSB2 and NTB2 on level detector ND. Also in this case amplifier 62 and a relay with winding 63 and make contact 64 are arrranged in each phase. On the operation of a relay, a blocking signal appears on the corresponding output RRB2, RSB2, RTB2. There are no time delay circuits in the blocking circuits, which means that a blocking signal always precedes a tripping signal.

By the arrangement of an undervoltage detector having three inputs per phase which are each connected to one of the outputs of the phase selector, and three inputs per phase connected to the voltage inputs of the wave detector, as well as three outputs connected to the inputs RR1, RS1, RT1 of the relay unit, an undervoltage puts in one phase, caused by a single-pole tripping and a subsequent single-phase fault in another phase, can be caused to achieve triple-pole tripping. One condition, however, is that the fault in the latter phase occurs before the first-mentioned phase has been reclosed. Such an arrangement is disclosed in a co-pending application filed in the name of the same inventors and Assignee of this invention.

What is claimed is:

1. Circuitry for generating tripping and blocking signals for the protection of electrical components in an electrical power supply network as a result of the occurrence of faults therein, comprising:
    means for generation of respective tripping signals and blocking signals for each phase of the electrical power supply network in dependence on whether the fault lies ahead or behind the electrical component to be protected, respectively, in response to measurement of the voltage and current associated with transient waves generated by faults in each phase of the electrical power supply network;
    detection means having a predetermined operating level, for determining the presence of a first tripping signal resulting from the occurrence of a single phase fault and the presence of a second tripping signal resulting from the occurrence of a fault in another phase, and means for changing the operating level for detection of said second tripping signal upon detection of the first tripping signal; and
    means responsive to said detection means for generating respective tripping and blocking outputs for each phase of said electrical power supply network, whereby double or triple pole tripping is prevented unless the presence of said second tripping signal is detected.

2. Circuitry as in claim 1 wherein said detection means includes for each phase of the electrical power supply network first level detection means for determining the presence of a first tripping signal, and second level detection means for determining the presence of a second tripping signal, and said means for changing includes switching means for switching from said first to said second level detection means in response to the presence of a tripping signal detected by any of said first level detection means, and for switching back to said first level detection means after a predetermined time interval.

3. Circuitry as in claim 2 further comprising phase selector means responsive to the detection of a first tripping signal by any of said first level detection means for actuating said switching means.

4. Circuitry as in claim 2 wherein said phase selector means includes gating means responsive to the output of any of said first level detection means for generating an output signal for actuating said switching means, said gating means being inhibited by more than one output from any of said gating means.

5. Circuitry as in claim 2 wherein said phase selector means includes a timing circuit for generating said switching output signal in response to the output of said gating means and having a duration determining the period that said second level detection means is actuated whereupon said switching means switches to said first level detection means.

6. Circuitry according to claim 2 or 3 wherein each of said first and second level detection means comprise an amplifier circuit having a first input for receiving tripping signals from a respective phase of said means for generating and a second input adapted to be connected to respective first and second reference levels, and said means for switching connects said second inputs to said second reference level in response to the detection of a tripping signal in any of said phases, said means for switching connecting each of said second inputs to said first reference level after a predetermined time interval.

7. Circuitry according to claim 2 or 3 wherein said switching means switches from the respective outputs of said first and second level detection means.

8. Circuitry as in claim 1 wherein said means for changing the operating level for detection of said second tripping signal includes amplifier means for amplifying the tripping signal generated by said means for generation in which phase of said electrical power supply network, and switching means for adjusting the amplification of said amplifier means in response to the detection of a tripping signal by said detection means, and said detection means being responsive to the output of said amplifier means.

9. Circuitry according to claim 1 wherein said means for changing the operating level of detecting said second tripping signal includes means for multiplying said second tripping signal by a weighting function subsequent to the detection of the first tripping signal.

10. Circuitry according to claim 1 wherein said means for changing the operating level for detection of said second tripping signal includes filter means having variable amplifier circuit means, and switching means for adjusting the amplification of said variable amplifier means in response to the detection of a first tripping signal by said means for detecting.

11. Circuitry according to claim 10 wherein the amplification of said variable amplifier means is reduced for a predetermined period of time subsequent to the detection of the first tripping signal.

* * * * *